Oct. 20, 1953     E. C. KRUEGER ET AL     2,655,959
WORK CLAMP AND ALIGNING GAUGE FOR SAWING MACHINES
Filed May 21, 1951                                2 Sheets-Sheet 1
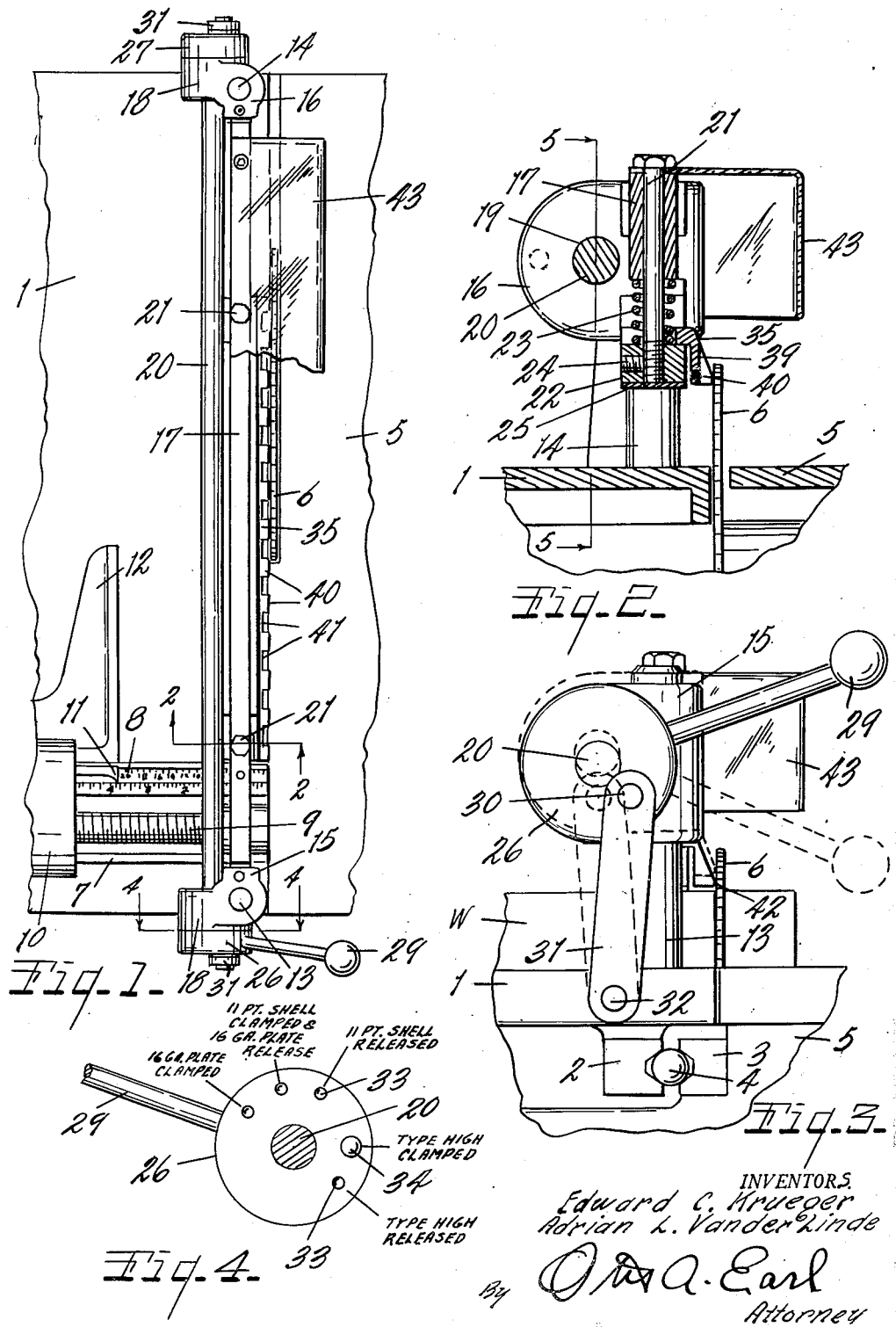
INVENTORS.
Edward C. Krueger
Adrian L. VanderLinde

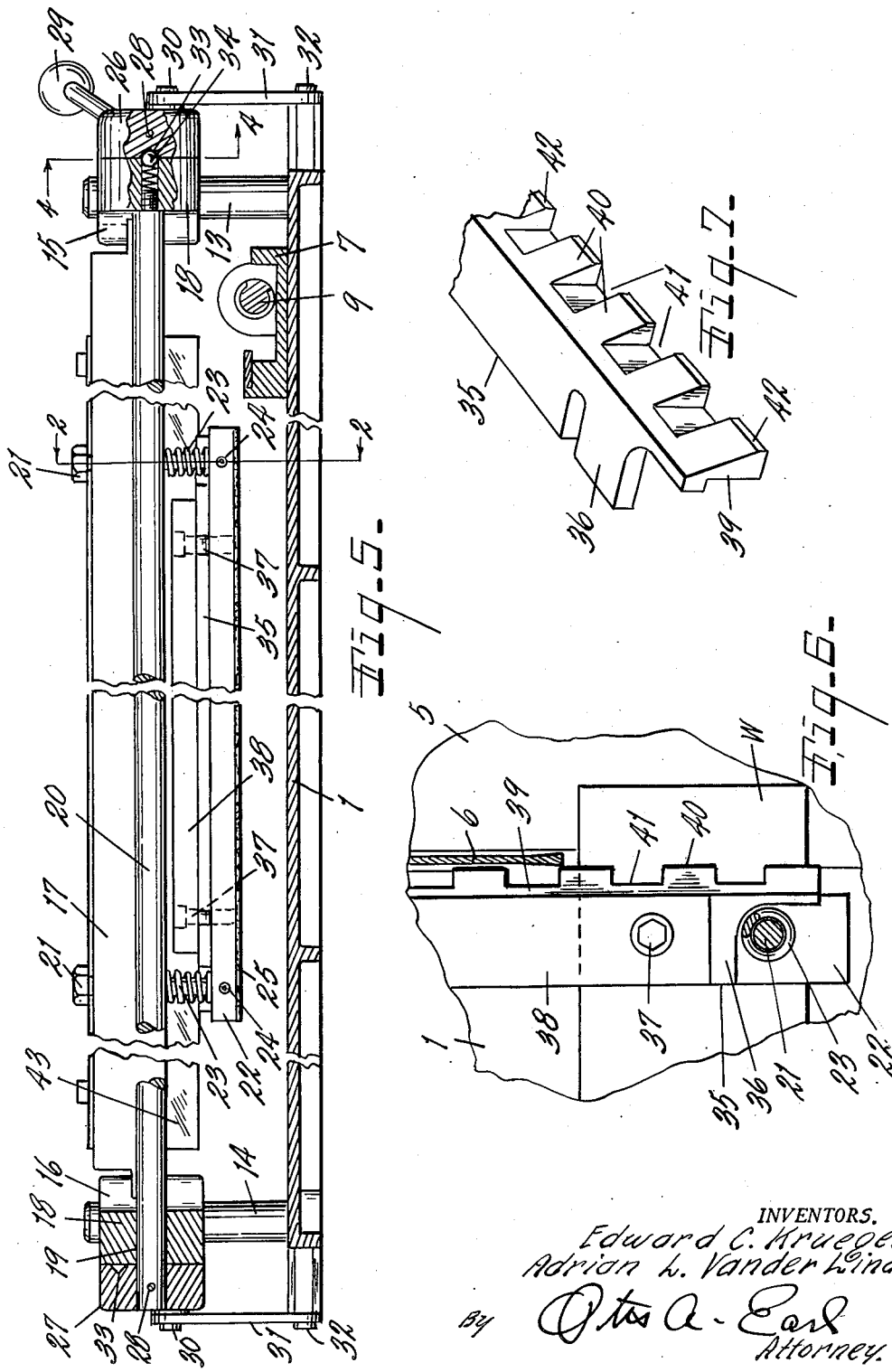

Patented Oct. 20, 1953

2,655,959

UNITED STATES PATENT OFFICE 2,655,959

WORK CLAMP AND ALIGNING GAUGE FOR SAWING MACHINES

Edward C. Krueger and Adrian L. Vander Linde, Kalamazoo, Mich., assignors to Hammond Machinery Builders, Incorporated, Kalamazoo, Mich.

Application May 21, 1951, Serial No. 227,373

4 Claims. (Cl. 143—174)

This invention relates to improvements in work clamp and aligning gauge for sawing machines.

The principal objects of this invention are:

First, to provide a sawing machine of the type used to saw and trim printers plates with means for clamping the plate to a reciprocable table, sliding gauge bar or other work feeding structure and visually aligning the plate to a desired saw line so that the plate can be advanced to a saw and accurately trimmed along the selected line by relative reciprocation between the saw and the work.

Second, to provide a work holding clamp for the reciprocable table of a sawing machine, which clamp is permanently mounted on the table to permit quick and convenient adjustment of the work on the table.

Third, to provide a hold down clamp for the table of a plate trimming saw which is easily adjusted to grip and release the various thicknesses of plates encountered in the printing trade.

Fourth, to provide a sight gauge bar on a hold down clamp which permits the operator to quickly and accurately align the work to the desired position relative to the clamp by visual observation of portions of the work which are to be retained and portions which are to be sawed off of the work.

Fifth, to provide a sight gauge for the hold down clamp of a reciprocable saw table, which gauge is automatically and accurately aligned with the saw line by reason of engagement with the saw line to trim the gauge to the plane of the saw after the gauge is mounted on the clamp.

Other objects and advantages relating to details of our invention will be apparent from a consideration of the following description and claims.

The drawings, of which there are two sheets, illustrate a preferred form of our hold down clamp and sight gauge bar.

Fig. 1 is a fragmentary plan view of a printing plate trimming saw with our hold down clamp and gauge operatively mounted thereon.

Fig. 2 is a fragmentary transverse vertical cross sectional view through the clamp and gauge and the adjacent portions of the saw, taken along the plane of the line 2—2 in Figs. 1 and 5.

Fig. 3 is a fragmentary end elevational view of the clamp and gauge.

Fig. 4 is a fragmentary vertical cross sectional view through the adjusting mechanism of the clamp taken along the plane of the line 4—4 in Fig. 1.

Fig. 5 is a fragmentary vertical longitudinal cross sectional view through the clamp and saw taken along the plane of the line 5—5 in Fig. 2.

Fig. 6 is a fragmentary enlarged plan view of the clamp and gauge illustrating the relative positions of the gauge and saw, the saw being illustrated in cross section.

Fig. 7 is a fragmentary perspective view of the gauge bar portion of the clamp.

Our work holding clamp and gauge is designed for application to sawing machines having a reciprocable work supporting table 1. As is common in machines of this type, the table is provided with ways, one of which is illustrated at 2 in Fig. 3 coacting with a fixed way 3 and ball bearings 4 for slidably mounting the table on the body or base 5 of the machine. A circular saw blade 6 is vertically adjustably mounted in a vertical plane on the base 5 to rotate alongside the longitudinally extending side edge of the table.

For the purpose of accurately measuring the work to be cut, the table is provided along its front side with a transversely extending gauge bar 7 having pica or other scale indicia 8 and an adjusting screw 9 thereon. The gauge bar 7 forms a slideway for a gauge finger slide 10 and the gauge finger slide is provided with a pointer 11 and gauge finger 12 cooperative with the pica scale indicia. Normally the gauge finger slide is provided with a driving connection to the adjusting screw for accurate adjustment of the gauge finger.

In order to securely and accurately clamp the work in the form of printing plates to the table 1, we have provided a pair of fixed columns 13 and 14 mounted at the front and rear respectively of the table 1 and adjacent to the longitudinal working edge of the table. Slidably mounted on the columns 13 and 14 are a pair of head brackets 15 and 16 which are shaped on their opposed edges to receive and be securely fastened to a longitudinally extending support beam 17. Extending laterally from the brackets 15 and 16 and on the opposite sides thereof from the saw 6 are generally circular bearing portions 18 extending in parallel planes transverse to the plane of the saw. The bearing portions 18 are longitudinally bored as at 19 to rotatably receive an adjusting shaft 20 which projects through each of the bearing portions.

The beam 17 is vertically bored at two spaced points to pass the mounting screws 21. The lower ends of the mounting screws project below the beam and are threadedly engaged in a clamp bar 22 which extends longitudinally in spaced relationship underneath the beam. Springs 23 sleeved around the screws 21 can be pre-loaded by adjusting the screws 21 to yieldingly mount the clamp bar on the beam. Set screws 24 clamp the screws 21 in their adjusted position. Desirably the under work engaging surface of the clamp bar is provided with a leather or other soft work engaging facing 25.

In order to move the clamp bar 22 and beam 17 vertically in a clamping and releasing action the ends of the shaft 20 are provided with wheel-like crank elements 26 and 27, which are non-rotatably pinned to the shaft as at 28. The crank elements 26 and 27 have flat bearing engagement with the outer faces of the bearing portions 18 of the brackets 15 and 16 as is best illustrated in Fig. 5. The front crank element 26 is provided with an operating arm or handle 29. Each of the crank elements 26 and 27 carries a crank pin 30 located eccentrically with respect to the shaft 20 and the pins 30 are connected by links 31 to fixed studs 32 mounted on the front and back edges of the table 1. It will thus be seen that rotation of the crank elements 26 and 27 and the shaft 28 by operation of the handle 29 will cause the crank pins 30 to rotate. Connection of the pins 30 to the table by the links 31 imparts a vertical movement to the shaft and to the head brackets 15 and 16 with the brackets being guided in a fixed vertical path along the columns 13 and 14.

Desirably the inner faces of the crank elements 26 and 27 are provided with shallow locating recesses 33 spaced angularly therearound to coact with spring pressed ball detents carried by the head brackets, one of which is illustrated at 34 and the recesses 33 are spaced to locate the crank elements and shaft in positions to clamp the standard thicknesses of printers plates.

In order to permit the saw operator to quickly and accurately check the proper location of the work underneath the clamp bar 22 to assure that the saw line on the work is aligned with the adjacent cutting plane of the saw, the clamp bar 22 carries a sight gauge bar generally indicated at 35. The gauge bar 35 is generally L-shaped in cross section and provided with an upper flange 36 which overlies the top of the clamp bar 22 and is secured thereto by screws 37 and a strap 38. The depending flange 39 of the gauge bar lies adjustably alongside of the clamp bar 22 between the clamp bar and the saw 6. On its outer side adjacent to the saw the flange 39 is provided with a series of longitudinally spaced and upwardly inclined buttress-like projections 40 which leave a plurality of sight recesses 41 along the edge of the gauge bar. The gauge bar is desirably made of relatively soft metal so that it will not damage the saw 6 and so that the gauge bar can be originally mounted on the clamp bar to project somewhat into the plane of the saw. Then on first movement of the table 1 and gauge bar along the saw, the saw will trim off the lower ends of the projections 40 as at 42 in an accurate location of the saw line of the machine.

In visually locating the work under the clamp bar the operator can view portions of the work as indicated at "W" in Fig. 6 through the sight recesses 41 to accurately locate the desired saw line on the work with the edges 42 of the gauge bar and thus be certain that the saw will accurately trim the work. This is of particular importance in making the first cut on a plate where the only reference point or line is the line between the rough edge of the plate and the desired printing surface that is to be retained. After making the initial cut along one side of the plate, successive cuts may be regulated by the desired dimensions of the plate as determined with the gauge finger 12, but even in making cuts to a measured width the sight recesses 41 in the sight gauge bar are useful in permitting visual checking of the work to be sure that the operator has not miscalculated his measurements or adjustment of the gauge finger.

We have found it further desirable to provide a transparent chip guard 43, which is bolted to the top of the beam 17 and projects over the saw 6. The guard 43 may be open at its rear end and moves upwardly and downwardly with the beam and clamp bar to always be in working position without interfering with the adjustment of the work and the clamp.

Having thus described our invention, what we claim as new and desire to secure by Letters Patent is:

1. In combination with a plate sawing machine having a circular saw with a reciprocable work supporting table mounted to slide alongside the saw, a pair of columns projecting above the front and rear of said table, head brackets slidably mounted on said columns and interconnected by a longitudinally extending beam, an adjusting shaft rotatably carried by said brackets, crank elements non-rotatably carried on the ends of said shaft and having faces opposed to said brackets, crank pins eccentrically mounted on said crank elements with respect to said shaft, links connecting said pins to fixed points on said table, locating detents coacting between the opposed faces of said brackets and crank elements, a clamp bar yieldingly mounted along the under side of said beam to be reciprocated thereby above said table, and a sight gauge bar of soft metal carried by said clamp bar, said sight gauge bar having a flange depending between said saw and said clamp bar with a series of longitudinally spaced lateral projections thereon extending to the plane of the adjacent side of the saw.

2. In combination with a plate sawing machine having a circular saw with a reciprocable work supporting table mounted to slide alongside the saw, a pair of columns projecting above the front and rear of said table, head brackets slidably mounted on said columns and interconnected by a longitudinally extending beam, an adjusting shaft rotatably carried by said brackets, crank elements non-rotatably carried on the ends of said shaft and having faces opposed to said brackets, crank pins eccentrically mounted on said crank elements with respect to said shaft, links connecting said pins to fixed points on said table, locating detents coacting between the opposed faces of one of said brackets and crank elements, a clamp bar mounted along the under side of said beam to be reciprocated thereby above said table, and a sight gauge bar of soft material carried by said clamp bar, said sight gauge bar having a flange depending between said saw and said clamp bar with a series of longitudinally spaced lateral projections thereon extending to the plane of the adjacent side of the saw.

3. In combination with a plate sawing machine having a circular saw with a reciprocable work supporting table mounted to slide alongside the saw, a pair of fixed guides projecting above the front and rear of said table, head brackets slidably mounted on said guides and interconnected by a longitudinally extending beam, an adjusting shaft rotatably carried by said brackets, crank elements non-rotatably carried on said shaft, one of said brackets, crank pins eccentrically mounted on said crank elements with respect to said shaft, links connecting said pins to fixed points on said table, locating detents coacting between said one bracket and said one crank element, means forming a clamping surface along the under side of said beam to be reciprocated thereby above said table, and a sight gauge bar of soft metal carried by said beam, said sight gauge bar depending between said saw and said beam and having a series of longitudinally spaced lateral projections thereon extending to the plane of the adjacent side of the saw.

4. In combination with a plate sawing machine having a circular saw with a reciprocable work supporting table mounted to slide alongside the saw, a pair of fixed guides projecting above the front and rear of said table, head brackets slidably mounted on said guides and interconnected by a longitudinally extending beam, an adjusting shaft rotatably carried by said brackets, crank elements non-rotatably carried on said shaft, one of said elements having a face opposed to one of said brackets, crank pins eccentrically mounted on said crank elements with respect to said shaft, links connecting said pins to fixed points on said table, locating detents coacting between said one bracket and said one crank element, means forming a clamping surface along the under side of said beam to be reciprocated thereby above said table, and a sight gauge bar carried by said beam, between said saw and said beam and having a series of longitudinally spaced lateral projections thereon extending to the plane of the adjacent side of the saw.

EDWARD C. KRUEGER.
ADRIAN L. VANDER LINDE.

References Cited in the file of this patent

UNITED STATES PATENTS

| Number | Name | Date |
| --- | --- | --- |
| 415,940 | Davis | Nov. 26, 1889 |
| 594,985 | Dalbey | Dec. 7, 1897 |
| 1,577,346 | Narrow | Mar. 16, 1926 |
| 1,588,112 | Johnsen | June 8, 1926 |
| 1,618,170 | Cheshire | Feb. 22, 1927 |
| 2,167,082 | Morris | July 25, 1939 |
| 2,253,354 | Svensson | Aug. 19, 1941 |
| 2,260,883 | Castle | Oct. 28, 1941 |
| 2,554,730 | Chandler | May 29, 1951 |